Jan. 28, 1969   J. PALFREYMAN ET AL   3,424,434
BLADED ROTOR FOR A FLUID FLOW MACHINE, E.G. A GAS TURBINE ENGINE
Filed Sept. 12, 1967
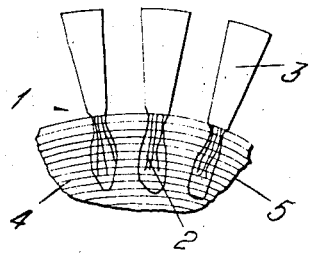
Inventors
Jack Palfreyman
Norman Willie Shepherd
By
Cushman, Darby & Cushman
Attorneys

United States Patent Office 3,424,434
Patented Jan. 28, 1969

3,424,434
BLADED ROTOR FOR A FLUID FLOW MACHINE,
E.G. A GAS TURBINE ENGINE
Jack Palfreyman, Tansley, near Matlock, and Norman Willie Shepherd, Shelton Lock, England, assignors to Rolls-Royce Limited, Derby, England, a company of Great Britain
Filed Sept. 12, 1967, Ser. No. 667,168
Claims priority, application Great Britain, Apr. 3, 1967, 15,221/67
U.S. Cl. 253—77                    14 Claims
Int. Cl. F01d 5/28; F04d 29/26

ABSTRACT OF THE DISCLOSURE

A compressor rotor of a gas turbine engine, or other bladed rotor, comprises a rotor hub member having circumferentially extending fibres therein, and a plurality of blades are united with and extend radially outwardly of the outer periphery of the rotor hub member. The blades each have fibres therein which extend substantially radially inwardly of the outer periphery of the hub and which overlap the circumferentially extending fibres in the hub. The fibres of blades are united with the fibres of the hub.

---

This invention concerns a bladed rotor (and method of making a bladed rotor) for a fluid flow machine, e.g. a gas turbine engine and, although it is not so restricted, it is more particularly concerned with a rotor of a gas turbine engine compressor.

This application contains subject matter divided out of our co-pending application Ser. No. 424,658, filed Jan. 11, 1965.

According to the present invention, there is provided a bladed rotor comprising a rotor hub member having circumferentially extending fibres therein, and a plurality of blades which are united with, and which extend radially outwardly of the outer periphery of, the rotor hub member, the said blades having fibres therein which extend substantially radially inwardly of the said outer periphery and which overlap the said circumferentially extending fibres to which they are united.

Preferably, the said circumferentially extending fibres are disposed adjacent the outer periphery of the rotor hub member.

The fibres may be individually coated.

The fibres may be of inorganic material; e.g. they may be formed of a ceramic constituted by an oxide, nitride or carbide. The inorganic material from which the fibres are formed may be sapphire, or silica, or silicon nitride, or silicon carbide.

Alternatively, the fibres may be formed from carboniferous material such, for example, as graphite.

Yet another possibility is for the fibres to be formed of boron.

Each fibre may be coated with a metal or alloy. For example, it may be coated with silver, or nickel or iron or titanium or platinum or columbium, or aluminium, or any alloy thereof.

Alternatively, each fibre may be coated with a synthetic resin material such for example as an epoxy or polymide, or polyimidazole or polyquinoxaline, or polythiazole resin.

The bladed rotor may, if desired, be formed of synthetic resin material reinforced by the said fibres.

The invention is illustrated, merely by way of example, in the accompanying drawing which is a diagrammatic view of part of a rotor of a gas turbine engine compressor.

In the drawing there is shown a gas turbine engine compressor rotor 1 in which individually coated fibres 2 are used in the formation of a plurality of angularly spaced apart blades 3, and separate coated fibres 4 are used in the formation of a disc 5 which forms a hub portion of the rotor from which the blades 3 extend radially outwardly of the outer periphery thereof. The fibres 4 extend circumferentially of the disc 5 and are disposed adjacent the outer periphery thereof. The disc 5 and blades 3 are first formed separately after which the disc 5 and blades 3 are united by hot pressing them together. As a result, the fibres 2 of the blades 3 overlap and are bonded to the circumferential fibres 4 of the disc 5, the fibres 2 extending substantially radially inwardly of the said outer periphery.

The fibres 2, 4 may, for example, be silica fibres which have been coated with aluminum or with an epoxy, or polyimide or polyimidazole or polyquinoxaline or polythiazole resin.

Alternatively the fibres may be formed from a ceramic constituted by an oxide, nitride or carbide. The fibres may also be formed of sapphire, silica, silicon nitride or silicon carbide, coated with silver, or nickel, or iron, or an alloy thereof. Moreover, the fibres may be graphite or boron fibres coated with a synthetic resin (e.g. an epoxy or polyimide resin) or with a metal such, for example, as silver, nickel, platinum or columbium. Alternatively, the blades 3 and disc 5 may be formed of a synthetic resin material, such, for example, as an epoxy or a high temperature polyimide resin, reinforced by any of the said coated fibres.

Thus after the disc 5 and blades 3 have been hot pressed together, they will form, in the case of aluminum coated silica fibres, an integral aluminum structure reinforced by silica fibres.

What we claim is:

1. A bladed rotor comprising a rotor hub member having circumferentially extending fibres therein, and a plurality of blades which are united with, and which extend radially outwardly of the outer periphery of, the rotor hub member, the said blades having fibres therein which extend substantially radially inwardly of the said outer periphery and which overlap the said circumferentially extending fibres of the rotor hub member, said fibres of the blades being united with the circumferentially extending fibres of the rotor hub member.

2. A bladed rotor as claimed in claim 1 in which the said circumferentially extending fibres are disposed adjacent the outer periphery of the rotor hub member.

3. A bladed rotor as claimed in claim 1 in which the fibres are individually coated.

4. A bladed rotor as claimed in claim 1 in which the fibres are of inorganic material.

5. A bladed rotor as claimed in claim 4 in which the fibres are formed of a ceramic.

6. A bladed rotor as claimed in claim 4 in which the fibres are formed of a material selected from the group consisting of sapphire, silica, silicon nitride, and silicon carbide.

7. A bladed rotor as claimed in claim 4 in which the fibres are formed of boron.

8. A bladed rotor as claimed in claim 1 in which the fibres are of carboniferous material.

9. A bladed rotor as claimed in claim 8 in which the fibres are formed from graphite.

10. A balded rotor as claimed in claim 1 in which each fibre is coated with a metal containing material.

11. A bladed rotor as claimed in claim 10 in which each fibre is coated with a metal or alloy selected from the group consisting of silver, nickel, iron, titanium, platinum, columbium, and aluminum.

12. A bladed rotor as claimed in claim 1 in which each fibre is coated with a synthetic resin material.

13. A bladed rotor as claimed in claim 12 in which the synthetic resin material is selected from the group consisting of an epoxy, polyimide, polyimidazole, polyquinoxaline, and polythiazole resin.

14. A bladed rotor as claimed in claim 1 in which the bladed rotor is formed of synthetic resin material reinforced by the said fibres.

References Cited

UNITED STATES PATENTS

| | | | |
|---|---|---|---|
| 2,857,094 | 10/1958 | Erwin | 253—77 X |
| 3,098,723 | 7/1963 | Micks | 253—77 X |
| 3,248,082 | 4/1966 | Whitfield | 253—77 |

FOREIGN PATENTS

| | | |
|---|---|---|
| 775,816 | 5/1957 | Great Britain. |
| 901,075 | 7/1962 | Great Britain. |

EVERETTE A. POWELL, JR., *Primary Examiner.*

U.S. Cl. X.R.

230—134

PO-1050
(5/69)

UNITED STATES PATENT OFFICE
CERTIFICATE OF CORRECTION

Patent No. 3,424,434         Dated   January 28, 1969

Inventor(s) Jack Palfreyman & Norman Willie Shepherd

It is certified that error appears in the above-identified patent and that said Letters Patent are hereby corrected as shown below:

In the heading of the patent, near the top of column 1, the claim for priority is incomplete and should include the additional claim --; and application in Great Britain Jan. 15, 1964, 1387/64-- after "15,221/67".

SIGNED AND
SEALED
NOV 25 1969

(SEAL)
Attest:

Edward M. Fletcher, Jr.
Attesting Officer

WILLIAM E. SCHUYLER, JR.
Commissioner of Patents